UNITED STATES PATENT OFFICE.

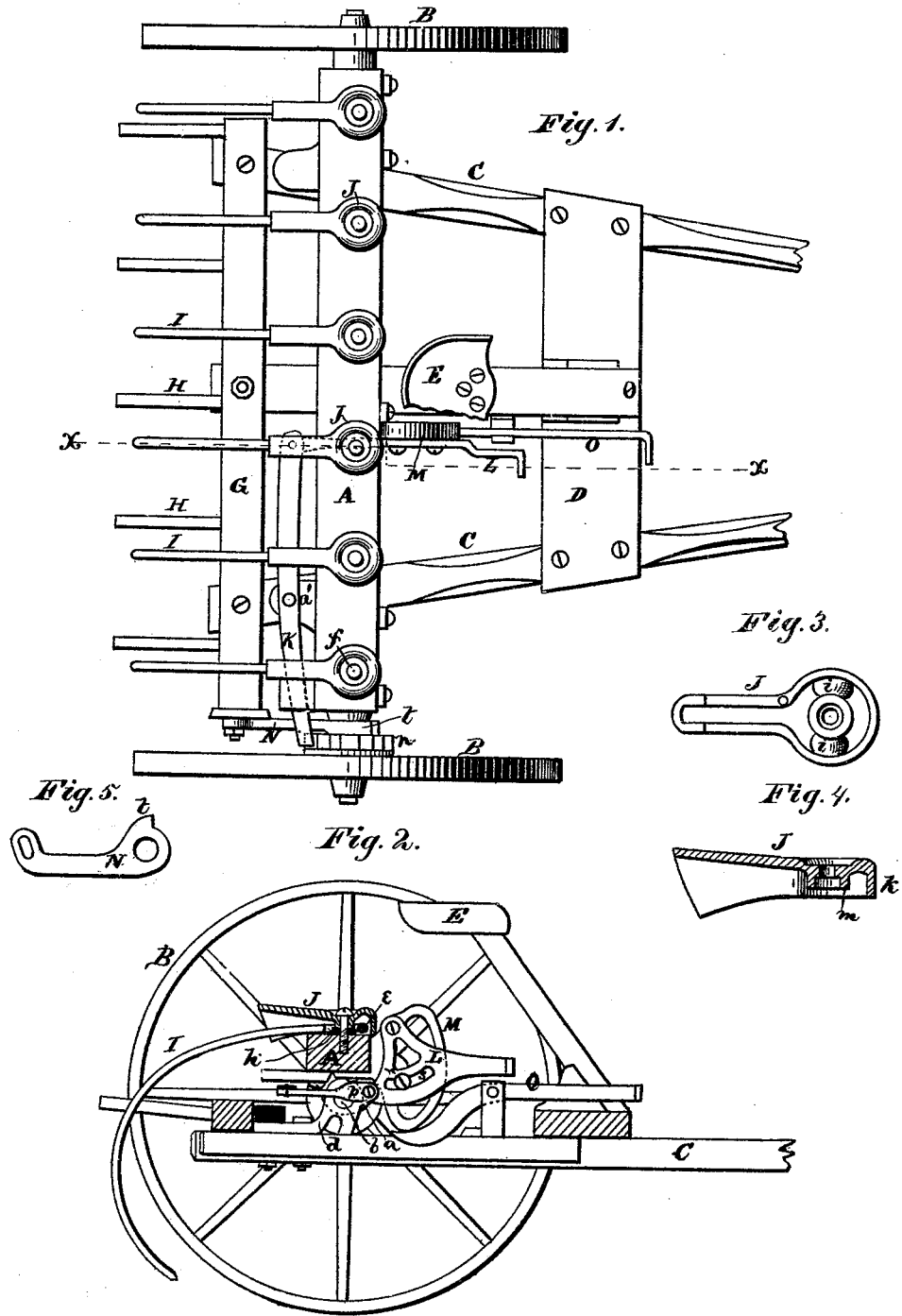

HIRAM MYERS, OF SPRINGFIELD, OHIO.

IMPROVEMENT IN HORSE HAY-RAKES.

Specification forming part of Letters Patent No. 183,198, dated October 10, 1876; application filed February 5, 1876.

*To all whom it may concern:*

Be it known that I, HIRAM MYERS, of Springfield, in the county of Clarke, and in the State of Ohio, have invented certain new and useful Improvements in Horse Hay-Rakes; and do hereby declare that the following is a full, clear, and exact description thereof, reference being had to the accompanying drawings, and to the letters of reference marked thereon, making part of this specification.

The nature of my invention consists in the construction and arrangement of a tooth-holder for horse hay-rakes, as will be hereinafter more fully set forth.

In order to enable others skilled in the art to which my invention appertains to make and use the same, I will now proceed to describe its construction and operation, referring to the annexed drawing, in which—

Figure 1 is a plan view of my horse hay-rake. Fig. 2 is a cross-section of the same through the line $x\ x$, Fig. 1. Figs. 3, 4, and 5 are detailed views of parts thereof.

A represents the rake-head, provided on the under side, near each end, with boxes $a\ a$, in which are placed the short axles $b\ b$, having the driving-wheels B B placed on their outer ends.

C C are the shafts, connected by the platform D, upon which the driver's seat E is supported, and the shafts suspended by suitable boxes $d\ d$ from the inner ends of the short axles $b\ b$. The shafts extend a suitable distance in rear of the rake-head, and have a cross-bar, G, secured on their rear ends, from the rear side of which project the usual clearing-teeth H H.

I I represent the rake-teeth, made in the usual form, and the upper ends of each tooth bent to form a loop, $e$. This end of the tooth is placed in a tooth-holder, J, secured on top of the rake-head A by means of a single screw, $f$, passing through the holder, through the loop $e$ of the tooth, and through a rubber block, $h$, placed under the tooth and into the rake-head.

The holder J is constructed as shown in Figs. 3 and 4, the inner end being round, with a downward-extending circumferential flange, $k$, and a smaller flange, $m$, concentric therewith, through which latter the screw $f$ passes, and this flange $m$ fits within the loop $e$ of the rake-tooth. On the sides of the flange $m$, on the under side of the holder, are convex projections $i$ for the tooth to roll over, so as to let the tooth play up, and drop down freely of its own weight without the aid of a spring over the tooth. The rear end of the holder is wedge-shaped, to form a guide for the movement of the tooth.

On the hub of one of the driving-wheels B is secured or formed a toothed wheel, $n$, into which the outer end of a lever, K, is to take, said lever being pivoted to a rear projection, $a'$, of one of the boxes $a$, and its inner end connected by a rod, $p$, with a triangular lever, L. This lever is pivoted to a casting, M, attached to and projecting from the front side of the rake-head. The movement of the lever L is limited by means of a pin or screw, $r$, passing through a curved slot, $s$, in the lever, as shown in Fig. 2.

By the driver pressing his foot on the front end of the lever L said lever is turned on its pivot so as to turn the lever K and throw its outer end into the toothed wheel $n$ on the driving-wheel, which, moving forward, turns the rake on the axle to trip the same and empty the load. As soon as the load is emptied the lever L is thrown out of the toothed wheel $n$ by means of a cam, $t$, and the rake falls down in position again of its own weight. The cam $t$ is formed on the front end of a bar, N, as shown in Fig. 5, and the axle $b$ passes through the same. The rear end of the bar N is adjustably fastened to the bar G, whereby the cam may be adjusted so as to disengage the lever L from the toothed wheel $n$ at any point desired.

The rake is locked by means of a pivoted foot-lever, O, the rear end of which is made to bear on the under side of the casting M.

To the above devices for dumping and locking the rake I, however, make no claim in this application.

Having thus fully described my invention, what I claim as new, and desire to secure by Letters Patent, is—

1. The tooth-holder J, constructed as described, with central flange m and convex projections i i, for the purposes herein set forth.

2. The combination of the tooth I with loop e, the holder J with flanges k m, and convex projections i i, the rubber block h, and screw f, all substantially as and for the purposes herein set forth.

In testimony that I claim the foregoing I have hereunto set my hand this 28th day of December, 1875.

HIRAM MYERS.

Witnesses:
J. J. SMITH,
J. A. BAKER.